(12) United States Patent
Henry

(10) Patent No.: US 10,786,750 B1
(45) Date of Patent: Sep. 29, 2020

(54) SPRAY-ROTO DISTILLATION DEVICE

(71) Applicant: Ryan Henry, Hayward, CA (US)

(72) Inventor: Ryan Henry, Hayward, CA (US)

(*) Notice: Subject to any disclaimer, the term of this patent is extended or adjusted under 35 U.S.C. 154(b) by 0 days.

(21) Appl. No.: 16/563,585

(22) Filed: Sep. 6, 2019

Related U.S. Application Data

(60) Provisional application No. 62/727,705, filed on Sep. 6, 2018.

(51) Int. Cl.
  *B01D 3/08* (2006.01)
  *B01L 7/02* (2006.01)
  *B01D 3/06* (2006.01)

(52) U.S. Cl.
  CPC .............. *B01D 3/085* (2013.01); *B01D 3/06* (2013.01); *B01L 7/02* (2013.01); *B01L 2300/185* (2013.01); *B01L 2400/0466* (2013.01)

(58) Field of Classification Search
  CPC .. B01D 3/06; B01D 3/085; B01L 7/02; B01L 2300/185; B01L 2400/0466
  See application file for complete search history.

(56) References Cited

U.S. PATENT DOCUMENTS

2017/0252668 A1* 9/2017 Adjabeng ............ B01D 5/0006

* cited by examiner

*Primary Examiner* — Brian A McCaig
(74) *Attorney, Agent, or Firm* — Shifrin Patent Law; Dan Shifrin

(57) ABSTRACT

A rotary evaporator distillation device is provided that includes a flash vaporization section in which the bulk of solvent is removed. By removing most of the solvent before it enters the evaporating flask, the entire device may be smaller in size but achieve distillation at a pace available only in much larger systems.

19 Claims, 5 Drawing Sheets

SPRAY-ROTO DISTILLATION DEVICE

RELATED APPLICATION DATA

The present application is related to commonly-owned U.S. Application Ser. No. 62/727,705 entitled SPRAY-ROTO DISTILLATION DEVICE, filed on Sep. 6, 2018, which application is incorporated herein by reference in its entirety.

TECHNICAL FIELD

The present invention relates to devices and methods of distillation.

BACKGROUND ART

Distillation is the process by which chemical separation is achieved through phase change. Distillation takes place by increasing the temperature, reducing the pressure, or both of a solid or liquid sample until some portion of the sample is vaporized. The vapor is then routed to a cooling section where condensation takes place and the vapor is changed back to a liquid or solid. The collected condensate is thus the purified collection of the lower boiling point component(s) of the original sample, leaving behind in the evaporating flask the higher boiling point component(s) that did not vaporize. A sample that contains more than one component can be purified through distillation if the difference in boiling points of the components is sufficient. Thus, the process may be repeated to further separate components at different boiling points.

Current rotary evaporator distillation machines, such as the one illustrated in FIG. 1, offer a very economical means of residual solvent removal and sample drying. A rotary evaporator (100) is a type of distillation device in which a sample (102) is placed inside a flask (104) that rotates in a heated bath (106). The rotation of the flask (104) causes the sample (102) to be spread along the walls of the flask (104), which increases the effective surface area for distillation and thins and agitates the sample (102). The bath (106) heats the flask (104) walls to aid evaporation and typically the internal pressure of the flask (104) is reduced by an external vacuum source. The reduction of pressure along with heating and agitation all encourage rapid evaporation of the sample (102) within the flask (104). The portion of the sample (102) that is evaporated is routed through a condenser (108) and the resulting condensate is collected in a second flask (110).

A machine capable of faster distillation uses a larger evaporating flask to achieve a larger effective surface area for distillation to take place. However, a large evaporating flask is not only unwieldy and hard to handle when removing the sample, it will also have more of the sample spread over this area. As the viscosity of the sample is increased, the distillation rate is reduced and the sample becomes stuck to the surface. Much of the sample may be lost or discarded due to the excessive labor in removing the sample from the large surface area. This presents a problem in that the rotary evaporator must be limited in size and is most often only used for smaller, non-industrial distillation processes.

SUMMARY OF THE INVENTION

Embodiments of the present invention provide a rotary evaporator distillation machine that includes a flash vaporization section in which the bulk of solvent is removed. By removing most of the solvent before it enters the evaporating flask, the entire system may be smaller in size but achieve distillation at a pace available only in much larger machines.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1:
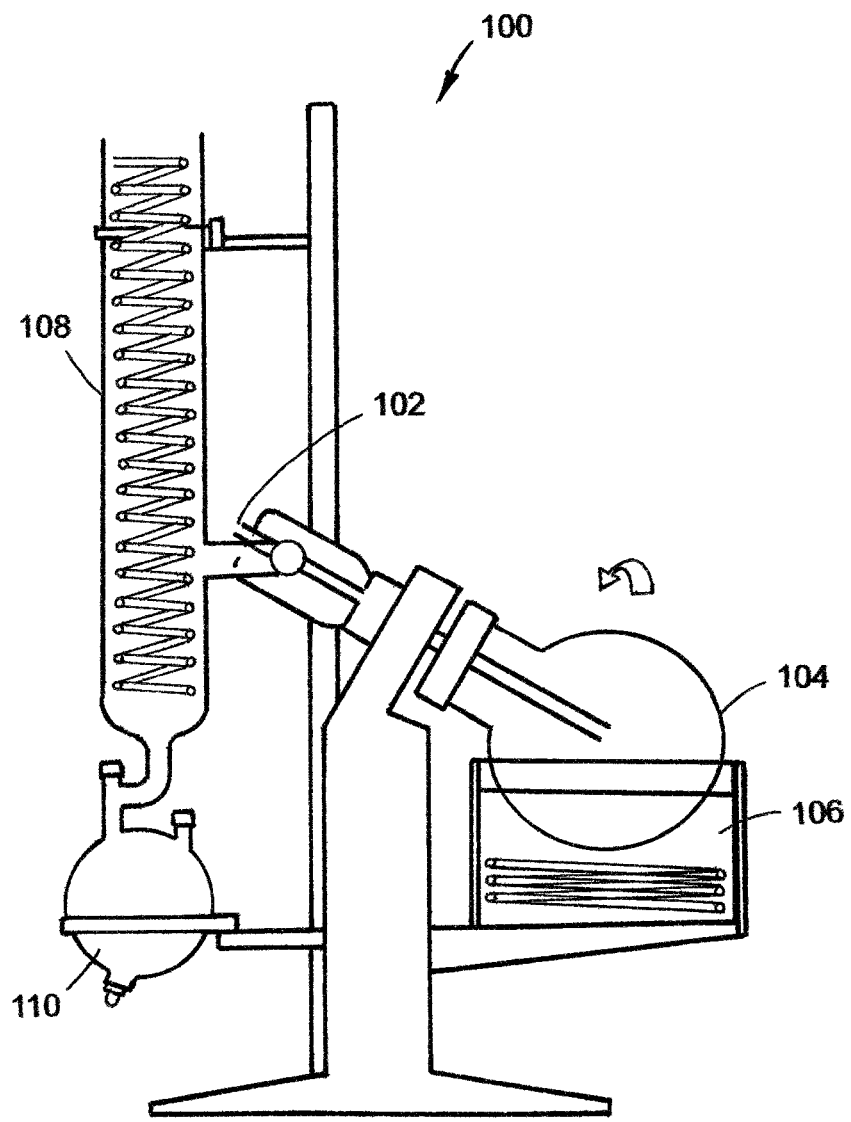
FIG. 1 schematically illustrates a prior art rotary evaporator distillation device.
Figure 2:
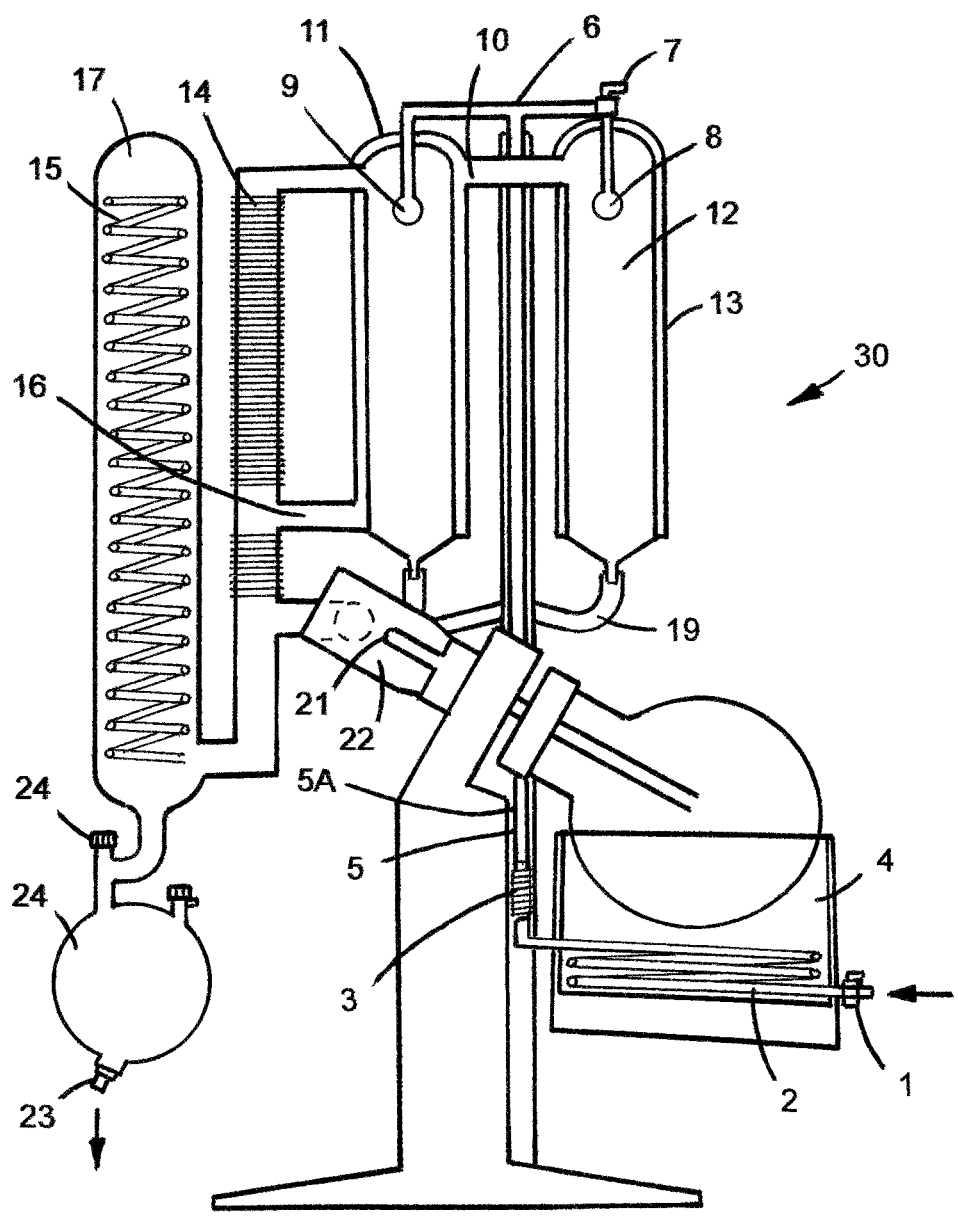
FIG. 2 schematically illustrates an embodiment of a rotary evaporator distillation device of the present invention.

FIG. 2 schematically illustrates an embodiment of a rotary evaporator distillation device (30) of the present invention. In operation, pressure in the device (30) is reduced by a pump (not shown) that allows a sample to be introduced into the device (30) by being sucked through a flow metering valve (1) and into coils or pipes (2) placed in a heated bath (4) of the rotary evaporator. This causes the sample to be heated and the pressure inside the coils (2) to increase. The sample is then routed out of the coils (2) and through tubing (3), expandable or flexible with excess slack to allow the height of the liquid in the bath (4) to be raised or lowered while the tubing (3) remains fixed in an insulated pipe/tube (5). This pipe or tubing (5) is wrapped with a heat tape element (5A) that acts as an additional heating zone for the material inside the heated pipe (5) as it travels to a liquid manifold (6). The heated pipe (5) is also insulated and may be routed inside of a long metal cylinder, which may also serve as support for other parts.

As noted above, the heated pipe (5) is connected to the liquid manifold (6) on top of the device (30). Increased pressure inside the heated pipe (5) along with a reduction in pressure inside the device (30) causes the sample to quickly vaporize as it enters a lower pressure zone in a process referred to herein as "flash vaporization." The remaining unvaporized liquid is then sprayed as fine droplets through a spray nozzle (8) onto the wall of the flash vaporization chamber (12). The flash vaporization chamber (12) includes an outer jacketed section (13), which may optionally also be wrapped with resistive heat tape that heats the walls of the chamber (12). Vapor created in the flash vaporization chamber (12) is then routed through another pipe (10) which connects to the outer jacketing of an additional flash vaporization chamber (11), with an additional spray nozzle (9). A valve (7) at the top of the liquid manifold (6) controls the proportional flow to each flash vaporization chamber (11), (12). The hot vapor transfers heat from any previous columns by flowing through the jacketing of any subsequent flash vaporization chambers and thus heating the walls of the chamber. The heated walls increase the vaporization of liquid sprayed on the inside of the column walls and also helps to partially condense the hot vapor flowing through the walls, which increases efficiency. This can be repeated with up to four different columns, or even more, increasing efficiency each time.

The vapor and condensed liquid from the additional vaporization chamber (11) is routed through a pipe (16) and to a cooling tube (14). The cooling tube (14) is preferably a metal cylinder approximately three to five inches in diameter with cooling fins (although it may be scaled up or down to fit a particular application). Vapor created from any other section of the device (30) is routed to the cooling tube (14), which ultimately connects to a condenser section (17). An external cooling device is used to cool the condenser section (17). One method of cooling is to use an external device to circulate cooling fluid through internal coils (15) within the condenser section (17). Vapor routed to this section (17) is condensed and the condensed material is then routed to a receiver flask (18) where it is collected.

Any material not vaporized in the flash vaporization chamber (12) is routed through another tube (19) into an evaporating flask (20). The flow into the evaporating flask (20) may be controlled with a valve (21). The evaporating flask (20) is partially submerged in the heating bath (4) and is heated and rotated. As the flask (20) is rotated, a thin film is deposited on the walls of the flask (20) and as it spins, gravity forces the sample down back into the lower portion of the flask (20). The motion of the sample reduces surface tension and increases the distillation rate for the last bit of solvent in the sample, which can be otherwise hard to remove, to desired levels. The vapor created in the evaporating flask (20) is routed through a vapor manifold (22) and into the condenser section (17), where it condenses and falls into the receiver flask (18) and is collected. The collected material can be collected by closing a receiver flask material valve (24) at the top and opening a drain port (23) at the bottom.

As will be appreciated, coils or pipes (2) inside the heat bath (4) should be formed from a material capable of good heat conductivity, such as a metal. Preferably, the sample is deposited onto the walls of the heated chamber (20) by spraying, whereby the small droplets would themselves have a relatively large surface area and heated vapors would partially distill the droplets as they are being sprayed onto the wall of the chamber (20), accelerating the vaporization process.

Figure 3:
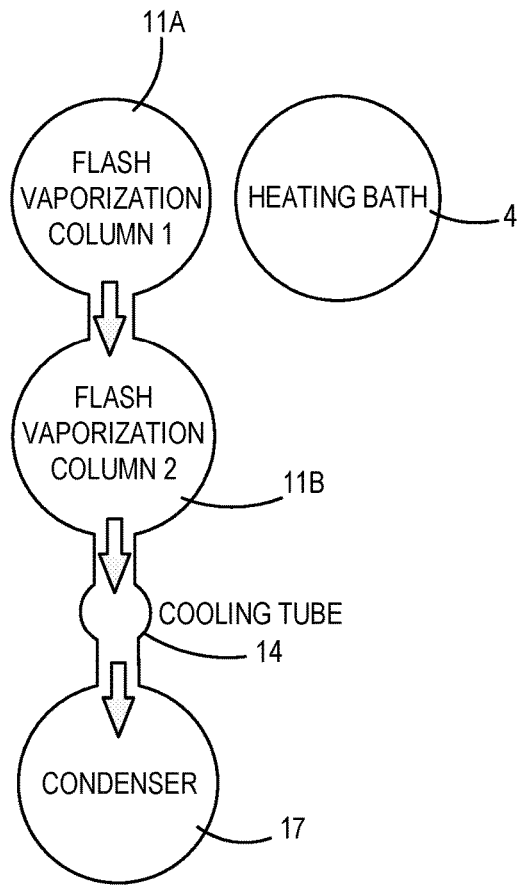
FIG. 3 illustrates a routing configuration for the rotary evaporator distillation device of FIG. 2.
Figure 4:
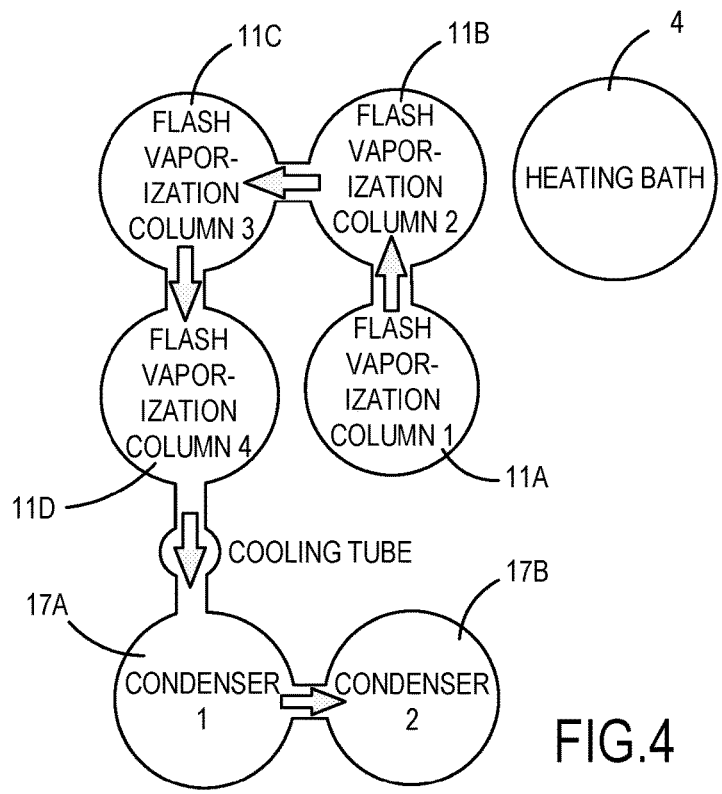
FIG. 4 illustrates another routing configuration for the rotary evaporator distillation device of FIG. 2.

Multiple flash vaporization sections may be connected in series so that one feeds sample into the next. By feeding the hot vapor into another operating column the efficiency is increased each time. This process is also known as "multiple effect distillation." The configurations for each column and vapor routing can be found in FIGS. 3-6. FIG. 3 illustrates two flash vaporization chambers (11A), (11B) that feed into one condenser (17) while FIG. 4 illustrates four flash vaporization chambers (11A), (11B), (11C), (11D) that feed into two condensers (17A), (17B).

Figure 5:
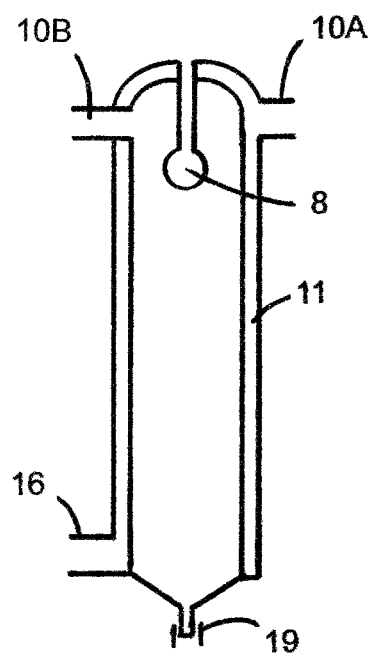
FIG. 5 illustrates a flash vaporization chamber for use with the rotary evaporator distillation device of FIG. 2.

Each flash vaporization chamber (11) may include five ports as illustrated in FIG. 5:

A. The spray nozzle (9), through which pre-heated sample enters the chamber (11);

B. The drain port and tube (21) at the bottom of the chamber (11), through which concentrated sample exists;

C. An inner-column hot vapor outlet (10A) at the top, through which vaporized material exits;

D. A jacketing vapor inlet (10B), through which vaporized material from previous flash vaporization column enters; and E. A jacketing vapor/liquid outlet (16) at the bottom of the chamber (11), through which condensed material exits.

The first flash vaporization column (11A, FIG. 3) will not have any vapor in the jacket. The first column (11A) should therefore include some heating mechanism, such as heating tape wrapped around, or a heated fluid circulating through, the outer jacketing.

Figure 6:
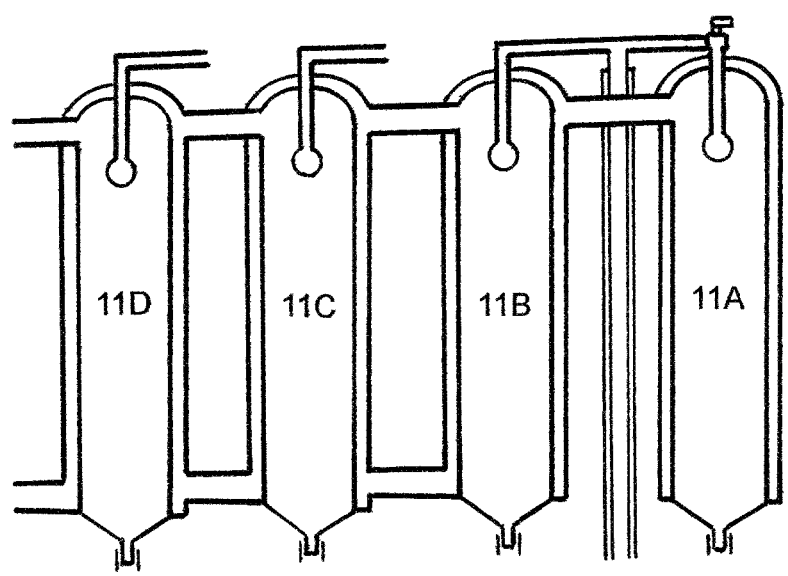
FIG. 6 illustrates a set of four flash vaporization chambers for use with the rotary evaporator distillation device of FIG. 2.

As described above, liquid is fed into the liquid manifold and distributed to the sprayer of each flash vaporization chamber (11). Hot vapor from the inside of each chamber (11) may be fed into the top of the jacketing or the cooling tube (14). Hot vapor/liquid condensate in the outer jacketing may be fed into the bottom of each jacket, as illustrated in FIG. 6. The system illustrated in FIG. 6 is configured with the chambers (11A), (11B), (11C), (11D) aligned linearly for ease of viewing the ports of each column. The actual configuration may instead be as shown in FIG. 3 or FIG. 4, although other configurations may also be used.

In an alternative embodiments of the rotary evaporator distillation machine of the present invention, the material in the evaporating flask may be agitated using means other than the rotation of the flask itself. For example, a fixed flask that does not rotate may be used with an alternative agitation method, such as by introducing a stream of gas into the liquid sample. The bubbling action would agitate the sample, causing the surface tension to break and serve the same purpose as rotating the flask. Another example is the use of an externally produced magnetic field to rotate or move a magnetized bar which is sealed inside the evaporating flask, thereby causing the sample to be agitated.

Figure 7:
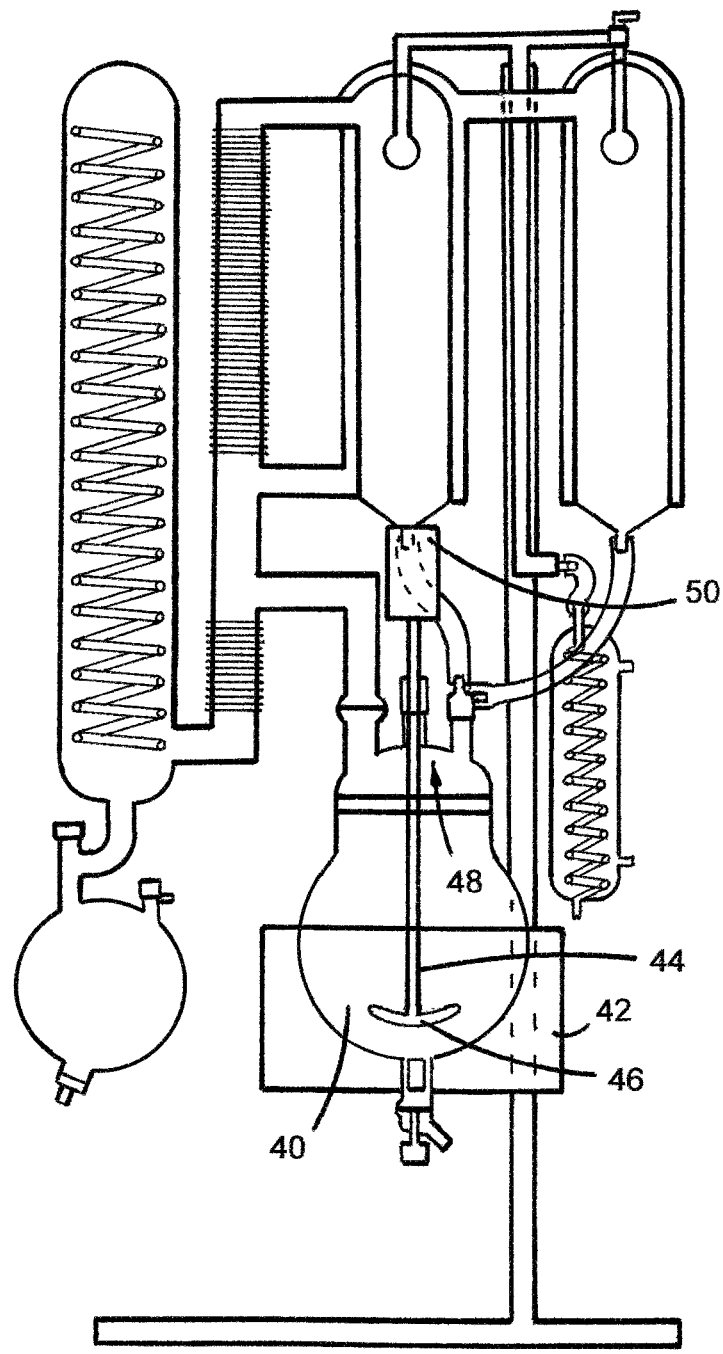
FIG. 7 schematically illustrates another embodiment of a rotary evaporator distillation device of the present invention.

Yet another method is to use a stirring mechanism that rotates a shaft with stirring blades inside the flask, as illustrated in FIG. 7. The evaporating flask (40) is partially submerged in a heating bath (42). A stirring shaft (44), with a one or more blades (46) on the end, is inserted through an opening (48) in the top of the flask (40). The shaft (44) maintains a vacuum tight seal to the flask (40) with special bearings or a magnetically coupled stirring sealing mechanism. Rotation of the shaft (44) and blade(s) (46) may be activated and their speed varied with a motor and controller (50).

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A rotary evaporation distillation device, comprising:
    an input port through which a sample to be distilled is introduced;
    a first flash vaporizer to receive and vaporize at least a first portion of the sample, leaving an unvaporized second portion of the sample;
    a condenser to receive and condense the vaporized first portion of the sample;

an evaporating flask configured to receive and vaporize the unvaporized second portion of the sample, the evaporating flask having an output port through which the vaporized second portion of the sample flows to the condenser; and a first output port through which the condensed vaporized first and second portions of the sample are collected.

2. The device of claim 1, further comprising:

a heated bath in which the evaporating flask is at least partially immersed; and a plurality of coils, immersed in the heated bath and coupled between the input port and the first flash vaporizer, through which the introduced sample is heated before entering the first flash vaporizer.

3. The device of claim 2, wherein the first flash vaporizer comprises:

a first chamber;

a first set of sprayers coupled to receive the heated sample and configured to spray the heated sample onto inside walls of the first chamber;

a second outlet port through which the vaporized first portion of the sample flows from the first chamber to the condenser; and a third outlet port through which the unvaporized second portion of the sample flows from the first chamber to the evaporating flask.

4. The device of claim 3, wherein the first chamber comprises heated walls.

5. The device of claim 1, wherein the evaporating flask is a rotating flask to agitate material in the evaporating flask.

6. The device of claim 1, further comprising a stirrer to agitate material in the evaporating flask.

7. The device of claim 6, wherein the stirrer comprises a magnetically rotated bar within the flask.

8. The device of claim 6, wherein the stirrer comprises blades within the evaporating flask, the blades secured to an end of the motorized shaft.

9. The device of claim 1, further comprising a tube through which a gas stream is injected into the evaporating flask to agitate material in the evaporating flask.

10. The device of claim 1, further comprising a second flash vaporizer coupled in series with the first flash vaporizer.

11. The device of claim 10, wherein the second flash vaporizer comprises:

a second chamber;

a second set of sprayers coupled to receive the heated sample and configured to spray the heated sample onto inside walls of the second chamber;

a fourth outlet port through which any vaporized portion of the sample flows from the second chamber to the condenser; and a fifth outlet port through which any unvaporized portion of the sample flows from the second chamber to the evaporating flask.

12. The device of claim 10, further comprising a third flash vaporizer coupled in series with the second flash vaporizer.

13. The device of claim 12, further comprising a fourth flash vaporizer coupled in series with the third flash vaporizer.

14. A method to distill a sample, comprising:

receiving a sample to be distilled through an input port of a distillation device;

passing the sample through coils in a heated bath;

spraying the heated sample onto inner walls of a first flash vaporizing chamber in which a first portion of the heated sample is vaporized and a second portion is unvaporized;

cooling the vaporized first portion;

passing the unvaporized second portion into an evaporating flask at least partially submerged in the heated bath to vaporize the second portion;

cooling the vaporized second portion;

condensing the cooled first and second portions; and collecting the condensed first and second portions through an output port of the distillation device.

15. The method of claim 14, further comprising spraying the vaporized first portion of the sample onto inner walls of a second flash vaporizing chamber before cooling the vaporized first portion.

16. The method of claim 14, further comprising agitating the unvaporized second portion in the evaporating flask.

17. The method of claim 16, wherein agitating the unvaporized second portion comprises rotating the evaporating flask.

18. The method of claim 16, wherein agitating the unvaporized second portion comprises stirring the second portion.

19. The method of claim 16, wherein agitating the unvaporized second portion comprises injecting a gas stream into the evaporating flask.

* * * * *